(12) United States Patent
Kim et al.

(10) Patent No.: US 11,728,097 B2
(45) Date of Patent: Aug. 15, 2023

(54) MULTILAYER ELECTRONIC COMPONENT

(71) Applicant: SAMSUNG ELECTRO-MECHANICS CO., LTD., Suwon-si (KR)

(72) Inventors: Min Hyang Kim, Suwon-si (KR); Ga Young An, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 20 days.

(21) Appl. No.: 17/484,642

(22) Filed: Sep. 24, 2021

(65) Prior Publication Data

US 2022/0208469 A1 Jun. 30, 2022

(30) Foreign Application Priority Data

Dec. 24, 2020 (KR) .......................... 10-2020-0183608

(51) Int. Cl.
| | |
|---|---|
| *H01G 4/30* | (2006.01) |
| *H01G 4/012* | (2006.01) |
| *H01G 4/08* | (2006.01) |
| *H01G 4/224* | (2006.01) |
| *H01G 4/12* | (2006.01) |
| *H01G 4/008* | (2006.01) |

(52) U.S. Cl.
CPC .............. *H01G 4/30* (2013.01); *H01G 4/008* (2013.01); *H01G 4/012* (2013.01); *H01G 4/1209* (2013.01); *H01G 4/224* (2013.01)

(58) Field of Classification Search
CPC .......... H01G 4/30; H01G 4/008; H01G 4/012; H01G 4/1209; H01G 4/224; H01G 4/232; H01G 4/228
USPC ...................... 361/306.3, 321.1, 321.3, 301.4
See application file for complete search history.

(56) References Cited

U.S. PATENT DOCUMENTS

| | | | |
|---|---|---|---|
| 2008/0128860 A1* | 6/2008 | Sawada ................. | H01G 4/232 257/E27.047 |
| 2009/0310276 A1* | 12/2009 | Tashima ................. | H01G 4/30 29/25.42 |
| 2015/0380164 A1* | 12/2015 | Kodama ............. | H01G 4/0085 361/301.4 |
| 2017/0309403 A1* | 10/2017 | Park ....................... | H01G 4/228 |
| 2020/0082987 A1 | 3/2020 | Lee et al. | |

FOREIGN PATENT DOCUMENTS

| | | | |
|---|---|---|---|
| JP | 2007177311 A | * | 7/2007 |
| JP | 2016-012689 A | | 1/2016 |
| KR | 10-2019-0121174 A | | 10/2019 |

* cited by examiner

*Primary Examiner* — Arun Ramaswamy
(74) *Attorney, Agent, or Firm* — Morgan, Lewis & Bockius LLP

(57) ABSTRACT

A multilayer electronic component includes a body including dielectric layers and internal electrodes alternately disposed with the dielectric layers and an external electrode disposed on the body. The external electrode includes an electrode layer connected to the internal electrode, an Sn plating layer disposed on the electrode layer, an Ni plating layer disposed on the Sn plating layer, and a plating layer including Pd disposed on the Ni plating layer.

14 Claims, 4 Drawing Sheets

MULTILAYER ELECTRONIC COMPONENT

CROSS-REFERENCE TO RELATED APPLICATION(S)

This application claims the benefit of priority to Korean Patent Application No. 10-2020-0183608 filed on Dec. 24, 2020 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of various types of electronic products such as display devices including liquid crystal displays (LCDs) and plasma display panels (PDPs), computers, smartphones, cell phones, and the like, to allow electricity to be charged therein and discharged therefrom.

As industry interest in electric parts for automobiles has recently increased, MLCCs are also required to have high reliability and high strength characteristics in order to be used in automobile or infotainment systems.

In particular, multilayer ceramic capacitors disposed near an engine bay are exposed to a high temperature environment. In this case, external electrodes of the MLCC, a solder bonding a substrate and the external electrodes of the MLCC, and the like may expand and contract according to temperature changes to cause mechanical stress to crack the solder.

In order to prevent this, a method of mounting a multilayer capacitor on a substrate using a conductive resin adhesive instead of a solder has been proposed. Accordingly, a structure of a plating layer of the MLCC needs to be changed.

SUMMARY

Exemplary embodiments provide a multilayer electronic component having excellent reliability.

Exemplary embodiments provide a multilayer electronic component provide a multilayer electronic component including a uniform plating layer.

Exemplary embodiments provide a multilayer electronic component suitable for mounting on a substrate using a conductive resin adhesive.

According to an aspect of the present disclosure, a multilayer electronic component includes: a body including dielectric layers and internal electrodes alternately disposed with the dielectric layers; and an external electrode disposed on the body. The external electrode includes an electrode layer connected to the internal electrode; an Sn plating layer disposed on the electrode layer; an Ni plating layer disposed on the Sn plating layer; and a plating layer including Pd disposed on the Ni plating layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
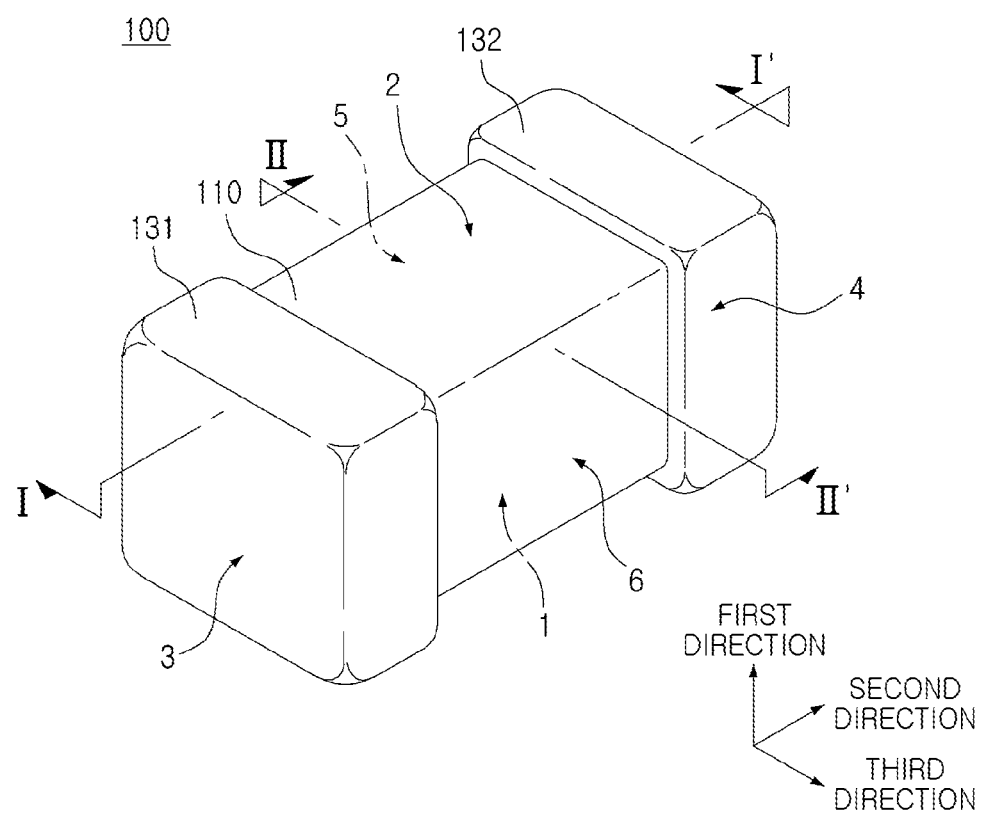
FIG. 1 is a schematic perspective view of a multilayer electronic component according to an exemplary embodiment in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or exemplary embodiment, e.g., as to what an example or exemplary embodiment may include or implement, means that at least an example or exemplary embodiment exists in which such a feature is included or implemented while all examples and exemplary embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

In the drawings, a first direction may be defined as a stacking direction or a thickness (T) direction, a second direction may be defined as a length (L) direction, and a third direction may be defined as a width (W) direction.

Multilayer Electronic Component

FIG. 1 is a schematic perspective view of a multilayer electronic component according to an exemplary embodiment in the present disclosure.

Figure 2:
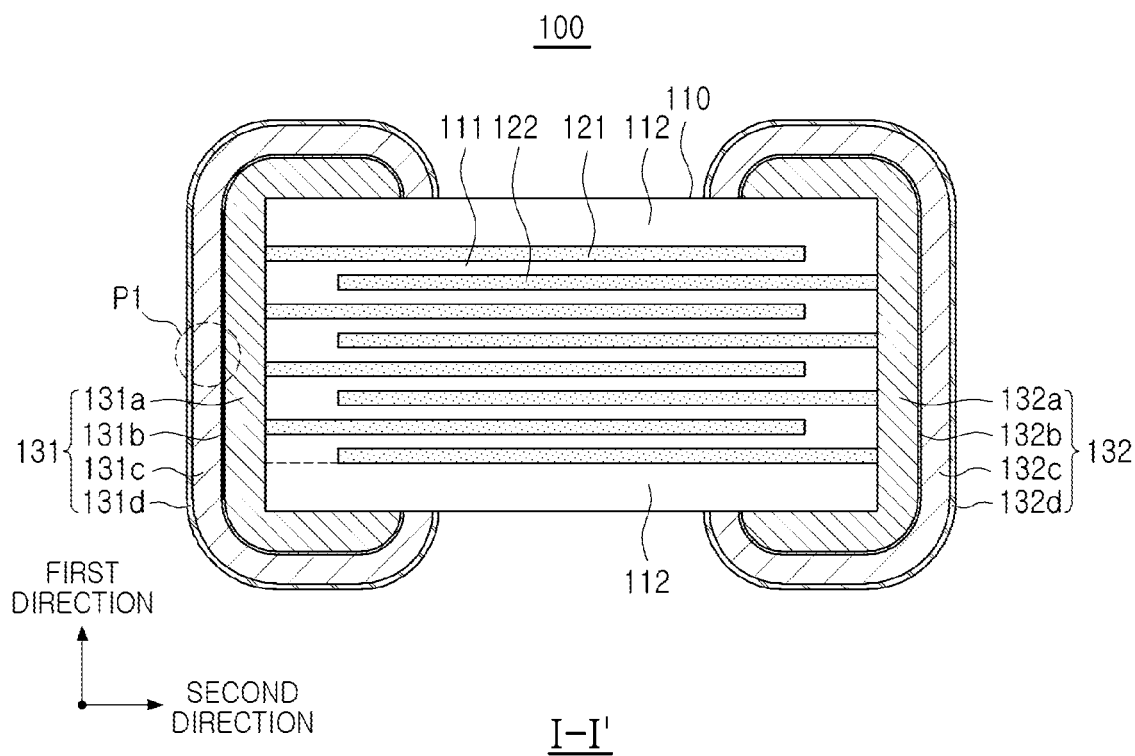
FIG. 2 is a cross-sectional view taken along line I-I' of FIG. 1.

FIG. 2 is a cross-sectional view taken along line I-I' of FIG. 1.

Figure 3:
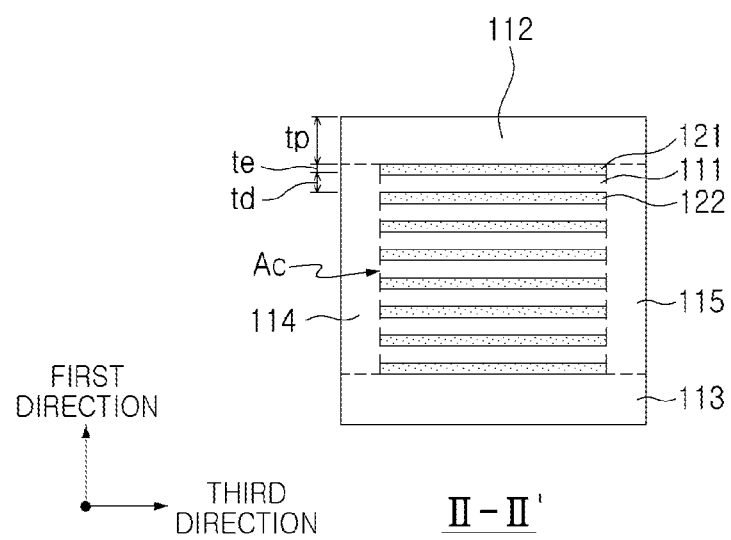
FIG. 3 is a cross-sectional view taken along line II-II' of FIG. 1.

FIG. 3 is a cross-sectional view taken along line II-II' of FIG. 1.

Figure 4:
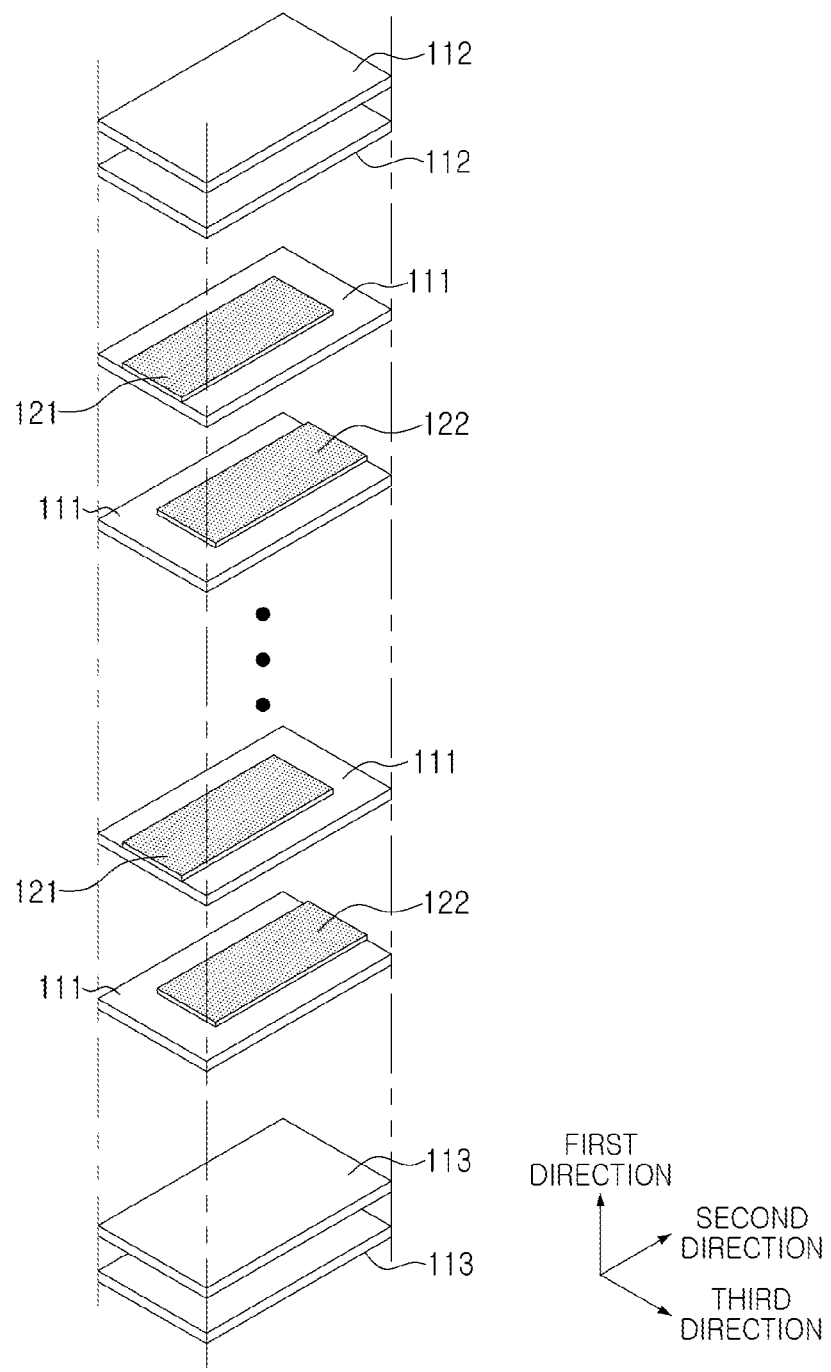
FIG. 4 is an exploded perspective view schematically illustrating a body in which dielectric layers and internal electrodes are stacked according to an exemplary embodiment in the present disclosure.

FIG. 4 is an exploded perspective view schematically illustrating a body in which dielectric layers and internal electrodes are stacked according to an exemplary embodiment in the present disclosure.

Figure 5:
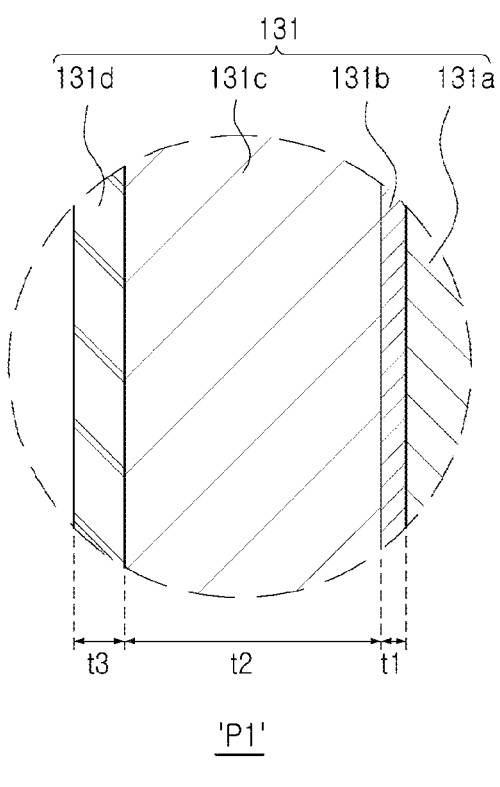
FIG. 5 is an enlarged view of a region P1 of FIG. 2.

FIG. 5 is an enlarged view of a region P1 of FIG. 2.

Hereinafter, a multilayer electronic component 100 according to an exemplary embodiment in the present disclosure will be described in detail with reference to FIGS. 1 through 5.

The multilayer electronic component 100 includes a body 110 including dielectric layers 111 and internal electrodes 121 and 122 alternately disposed with the dielectric layers and external electrodes 131 and 132 disposed on the body. The external electrodes include electrode layers 131a and 132a connected to the internal electrodes, Sn plating layers 131b and 132b disposed on the electrode layers, Ni plating layers 131c and 132c disposed on the Sn plating layers, and plating layers including Pd disposed on the Ni plating layers.

In the body 110, the dielectric layer 111 and the internal electrodes 121 and 122 are alternately stacked.

A specific shape of the body 110 is not limited, but, as illustrated, the body 110 may have a hexahedral or similar shape. Due to shrinkage of ceramic powder particle contained in the body 110 during firing, the body 110 may not have a hexahedral shape with perfectly straight lines but a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 an 6 connected to the first and second surfaces 1 and 2, connected to the third and fourth surfaces 3 and 4, and opposing each other in the third direction. Here, the second direction may be a direction perpendicular to the first direction, and the third direction may be a direction perpendicular to the first and second directions.

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited as long as sufficient electrostatic capacitance may be obtained therewith. For example, a barium titanate-based material, a lead composite perovskite-based material, or a strontium titanate-based material may be used. The barium titanate-based material may include a $BaTiO_3$-based ceramic powder particle, and the ceramic powder particle may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ obtained by partially dissolving calcium (Ca), zirconium (Zr), and the like in $BaTiO_3$.

As a material for forming the dielectric layer 111, various ceramic additives, organic solvents, binders, dispersants, etc. May be added to the powder particle such as barium titanate ($BaTiO_3$), or the like, according to purposes of the present disclosure.

A thickness td of the dielectric layer 111 may not be particularly limited, and may be determined in consideration of desired capacitance and a use environment. For example, a thickness td of the dielectric layer 111 may be 0.45 μm or less to achieve miniaturization and high capacitance of the multilayer electronic component.

The body 110 is disposed inside the body 110 and includes a capacitance forming portion Ac forming capacitance by including the first internal electrode 121 and the second internal electrode 122 disposed to face each other with the dielectric layer 111 interposed therebetween and cover portions 112 and 113 formed above and below the capacitance forming portion Ac in the first direction.

In addition, the capacitor forming portion Ac, a portion that contributes to the formation of capacitance of the capacitor, may be formed by repeatedly stacking a plurality of first and second internal electrodes 121 and 122 with the dielectric layer 111 interposed therebetween.

The cover portions 112 and 113 include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer or two or more dielectric layers on upper and lower surfaces of the capacitance forming portion Ac in the thickness direction, respectively, and basically serve to prevent damage to the internal electrodes due to physical or chemical stress.

The upper cover portion 112 and the lower cover portion 113 do not include internal electrodes and may include the same material as the dielectric layer 111.

That is, the upper cover portion 112 and the lower cover portion 113 may include a ceramic material, for example, a barium titanate ($BaTiO_3$)-based ceramic material.

Meanwhile, a thickness of the cover portions 112 and 113 may not be particularly limited. However, a thickness tp of the cover portions 112 and 113 may be 20 μm or less to more easily achieve miniaturization and high capacitance of the multilayer electronic component.

In addition, margin portions 114 and 115 may be disposed on side surfaces of the capacitance forming portion Ac.

The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on both sides of the ceramic body 110 in the width direction.

As shown in FIG. 3, the margin portions 114 and 115 may refer to regions between both ends of the first and second internal electrodes 121 and 122 and boundaries of the body 110 in a cross-section of the body 110 taken in a width-thickness (W-T) direction (or the first-third direction).

The margin portions 114 and 115 may basically serve to prevent damage to the internal electrodes due to physical or chemical stress.

The margin portions 114 and 115 may be formed by forming internal electrodes by applying a conductive paste on the ceramic green sheet excluding portions in which the margin portions are to be formed.

In addition, in order to suppress a step difference due to the internal electrodes 121 and 122, after stacking, the internal electrodes may be cut to be exposed to the fifth and sixth surfaces 5 and 6 of the body and a single dielectric layer or two or more dielectric layers may then be stacked on both side surfaces of the capacitance forming portion Ac in the width direction, thereby forming the margin portions 114 and 115.

The internal electrodes 121 and 122 are alternately stacked with the dielectric layers 111.

The internal electrodes 121 and 122 may include first and second internal electrodes 121 and 122. The first and second internal electrodes 121 and 122 may be alternately disposed to face each other with the dielectric layer 111 constituting the body 110 interposed therebetween and may be exposed to the third and fourth surfaces 3 and 4 of the body 110, respectively.

Referring to FIG. 2, the first internal electrode 121 may be spaced apart from the fourth surface 4 and exposed to the third surface 3, and the second internal electrode 122 may be spaced apart from the third surface 3 and exposed to the fourth surface 4. The first external electrode 131 may be disposed on the third surface 3 of the body and connected to the first internal electrode 121 and the second external electrode 132 may be disposed on the fourth surface 4 of the body and connected to the second internal electrode 122.

In other words, the first internal electrode 121 may not be connected to the second external electrode 132 and may be connected to the first external electrode 131, and the second internal electrode 122 may not be connected to the first external electrode 131 and may be connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

Here, the first and second internal electrodes 121 and 122 may be electrically separated from each other by the dielectric layer 111 disposed therebetween.

Referring to FIG. 4, the body 110 may be formed by alternately stacking a ceramic green sheet on which the first internal electrode 121 is printed and a ceramic green sheet on which the second internal electrode 122 is printed and subsequently sintering the green sheets.

A material for forming the internal electrodes 121 and 122 is not limited, and a material having excellent electrical conductivity may be used therefor. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on a ceramic green sheet. A printing method of the conductive paste for internal electrodes may be a screen printing method or a gravure printing method, but the present disclosure is not limited thereto.

A thickness te of the internal electrodes 121 and 122 may not be particularly limited and may be determined in consideration of intended capacitance and a use environment. For example, the thickness te of the internal electrodes 121 and 122 may be 0.45 μm or less to achieve miniaturization and high capacitance of the multilayer electronic component.

The external electrodes 131 and 132 may include electrode layers 131a and 132a connected to the internal electrodes 121 and 122, Sn plating layers 131b and 132b disposed on the electrode layers, Ni plating layers 131c and 132c disposed on the Sn plating layers, and plating layers 131d and 132d including Pd disposed on the Ni plating layers.

The external electrodes 131 and 132 may include first and second external electrodes disposed on the third and fourth surfaces 3 and 4 of the body 110 and connected to the first and second internal electrodes 121 and 122, respectively.

In general, in order to mount a multilayer electronic component on a substrate, the external electrodes of the multilayer electronic component are bonded to electrode pads of the substrate using a solder. However, in the case of using a solder, mechanical stress may occur due to expansion and contraction caused by temperature changes in external electrodes of the multilayer electronic component, the solder that bonds the substrate to the external electrodes, and the like, causing cracks in the solder itself.

To prevent this, a method of mounting a multilayer capacitor on a substrate using a conductive resin adhesive instead of a solder has been proposed. A thermal curing temperature of the conductive resin adhesive is lower than a melting point of the solder. Therefore, the use of a conductive resin adhesive, instead of a solder may reduce thermal stress, thereby improving reliability.

In the case of mounting a multilayer capacitor on a substrate using a conductive resin adhesive, the outermost plating layer may be formed of a Pd plating layer to prevent corrosion or precipitation of external electrodes and improve reliability. However, if the plating layer including Pd is too thick, a hydrogen absorption reaction may occur to cause a volume to swell and be broken, and accordingly, the Ni plating layer may be exposed to be oxidized, thereby degrading electrical connectivity. In addition, Pd is relatively expensive, so manufacturing costs of multilayer electronic components may increase.

According to the present disclosure, by arranging the Sn plating layer on the electrode layer, a surface on which the Ni plating layer is to be formed is flattened and impart conductivity, whereby the Ni plating layer may be uniformly formed, and accordingly, the plating layer including Pd may be formed to be uniform and thin. That is, by flattening the surface on which the Ni plating layer is to be formed, the surface of the Ni plating layer on which the plating layer including Pd is to be formed may be flattened, and accordingly, the plating layer including Pd may be formed thin and uniform.

The Sn plating layers 131$b$ and 132$b$ are disposed on the electrode layers 131$a$ and 132$a$ and may serve to flatten the surface on which the Ni plating layers 131$c$ and 132$c$ are to be formed and impart conductivity.

In the case of mounting a multilayer electronic component on a substrate using a conductive resin adhesive, the plating layer of the external electrode is generally formed by sequentially performing Ni plating and Pd plating on the electrode layer. In this case, plating disconnection may occur due to disconnection of the electrode layer, glass beading in which the glass included in the electrode layer protrudes externally, etc. In addition, during Ni plating, Ni mainly grows in a longitudinal direction (a direction perpendicular to the surface to be plated), and thus, plating disconnection may occur. In addition, even if disconnection of Ni plating layer does not occur, if the Ni plating surface is uneven, there is a high possibility that the Pd plating layer may be disconnected if the Pd plating layer is formed to be thin.

Sn is mainly grown in a transverse direction (a direction parallel to the surface on which plating is performed) during plating, and thus, when the Sn plating layers 131$b$ and 132$b$ are disposed on the electrode layers 131$a$ and 132$a$, the Sn plating layers 131$b$ and 132$b$ cover uneven surfaces of the electrode layers 131$a$ and 132$a$, thus flattening the surface on which the Ni plating layers 131$c$ and 132$c$ are to be formed and imparting conductivity. Accordingly, the surfaces of the Ni plating layers 131$c$ and 132$c$ may also be flattened, and the plating layers 131$d$ and 132$d$ including Pd may be formed to be thin uniformly on the Ni plating layers 131$c$ and 132$c$.

Here, a thickness of the Sn plating layers 131$b$ and 132$b$ may be 0.02 to 0.1 μm.

If the thickness of the Sn plating layers 131$b$ and 132$b$ is less than 0.02 μm, the effect of flattening the surface of the electrode layer and imparting conductivity may be insufficient.

Meanwhile, if the thickness of the Sn plating layers 131$b$ and 132 is greater than 0.1 μm, the Ni-Sn intermetallic compound may be formed to be thick between the Ni plating layer and the Sn plating layer, and in this case, cracks due to external stress may occur.

The Ni plating layers 131$c$ and 132$c$ may serve to stop the progress of dissolution by forming a passivation film for corrosive metal components such as sulfur components. In addition, the Ni plating layers 131$c$ and 132$c$ may be disposed to cover the electrode layers to protect the electrode layers from external harmful gases or the like. In addition, the Ni plating layers 131$c$ and 132$c$ may serve to prevent the metal of the electrode layer from depositing externally.

Here, a thickness of the Ni plating layers 131$c$ and 132$c$ may be 1 to 8 μm. That is, the thickness of the Ni plating layers 131$c$ and 132$c$ may be 1 to 8 μm may be greater than the thickness of the Sn plating layers 131$b$ and 132$b$.

If the thickness of the Ni plating layers 131$c$ and 132$c$ is less than 1 μm, the effect of protecting the electrode layer may be insufficient, and if the thickness of the Ni plating layers 131$c$ and 132$c$ is greater than 8 μm, capacitance per unit volume decreases as the volume of the multilayer electronic component increases, which may be disadvantageous to miniaturization and high capacitance.

The plating layers 131$d$ and 132$d$ containing Pd, having excellent corrosion resistance, may increase affinity with the external electrodes 131 and 132 and the conductive resin adhesives and improve electrical connectivity with the conductive resin adhesives.

Meanwhile, the plating layers 131$d$ and 132$d$ including Pd of the present disclosure may refer to plating layers including a metal. However, it does not mean only a case in which the plating layers 131$d$ and 132$d$ including Pd are consisted of only Pd, and may include a Pd-Ni alloy or other Pd alloys, and may include any other metal elements than Pd.

Here, a thickness of the plating layers 131$d$ and 132$d$ including Pd may be 0.1 to 1 μm.

If the thickness of the plating layers 131$d$ and 132$d$ including Pd is less than 0.1 μm, it may be difficult for the plating layers 131$d$ and 132$d$ to sufficiently cover the surface of the Ni plating layer, and electrical connectivity may be deteriorated as oxidation of the Ni plating layer may not be sufficiently prevented.

Meanwhile, if the thickness of the plating layers 131$d$ and 132$d$ including Pd is greater than 1 μm, hydrogen absorption reaction may occur to increase the volume of the plating layers 131$d$ and 132$d$ to be broken, and accordingly, the Ni plating layer is exposed and oxidized to degrade electrical connectivity. In addition, manufacturing costs may increase.

Meanwhile, a thickness t1 of the Ni plating layer, a thickness t2 of the Sn plating layer, and a thickness t3 of the plating layer including Pd may be sizes in the second direction measured at the center of the third and fourth surfaces of the body 110 in the first and third directions.

Referring to FIGS. 1, 2, and 5, the thickness t1 of the Ni plating layer, the thickness t2 of the Sn plating layer, and the thickness t3 of the plating layer including Pd may be measured from a cross-section taken in the first and second directions at the center of the body 110 in the third direction. That is, the thicknesses may be values measured by exposing the cross-section as shown in FIG. 2. Also, the center of the body in the third direction may refer to a ½ point of the body in the third direction. An observation tool for measurement may not be particularly limited, and for example, an optical microscope, a scanning electron microscope (SEM), or the like may be used.

The electrode layers 131$a$ and 132$a$ serve to mechanically bond the body 110 and the external electrodes 131 and 132 and serve to mechanically bond the internal electrodes 121 and 122 and the external electrodes 131 and 132 electrically and mechanically.

Meanwhile, the electrode layers 131$a$ and 132$a$ may be formed of any material as long as the material has electrical conductivity such as metal, and a specific material may be determined in consideration of electrical characteristics and structural stability.

For example, the electrode layers 131a and 132a may include conductive metal and glass.

A conductive metal used in the electrode layers 131a and 132a is not limited as long as it is a material that may be electrically connected to the internal electrode for forming capacitance. For example, the conductive metal may include at least one selected from the group consisting of nickel (Ni), copper (Cu), palladium (Pd), silver (Ag), gold (Au), platinum (Pt), tin (Sn), tungsten (W), titanium (Ti), and alloys thereof.

The electrode layers 131a and 132a may be formed by applying a conductive paste prepared by adding a glass frit to the conductive metal powder particle and subsequently sintering the conductive paste.

In addition, when the electrode layers 131a and 132a are sintered electrodes including conductive metal and glass, a plating disconnection phenomenon is highly likely to occur due to electrode layer disconnection, glass beading in which glass included in the electrode layer protrudes externally, and the like. However, when the Sn plating layers 131b and 132b are disposed on the electrode layers 131a and 132a according to the present disclosure, the uneven surfaces of the electrode layers 131a and 132a may be covered to flatten the surfaces on which the Ni plating layers 131c and 132c are to be formed, and impart conductivity.

Accordingly, when the electrode layers 131a and 132a include conductive metal and glass, the effect of inhibiting plating disconnection and the effect of forming a thin and uniform plating layer including Pd according to the present disclosure may be more remarkable.

The glass serves to mechanically bond the body 110 and the external electrodes 131 and 132, and the conductive metal electrically and mechanically connects the internal electrodes 121 and 122 and the external electrodes 131 and 132 to each other. Here, the conductive metal may be Cu.

In addition, the electrode layers 131a and 132a may include a first electrode layer connected to the internal electrodes 121 and 122 and including a conductive metal and glass and a second electrode layer disposed on the first electrode layer and including a conductive metal and a base resin.

In addition, the electrode layers 131a and 132a may also be formed using an atomic layer deposition (ALD), a molecular layer deposition (MLD) method, a chemical vapor deposition (CVD) method, a sputtering method, or the like.

In addition, the electrode layers 131a and 132a may be formed by transferring a sheet including a conductive metal onto the body 110.

A size of the multilayer electronic component 100 may not be particularly limited.

However, in order to achieve miniaturization and high capacitance at the same time, the number of stacking should be increased by thinning the dielectric layers and the internal electrodes, and thus, the effect of suppressing plating disconnection and the effect of form thin and uniform plating layer including Pd may be more remarkable in the multilayer electronic component having a 1005 size (length×width, 1.0 mm×0.5 mm) or less.

Therefore, the effect of improving reliability according to the present disclosure may be more remarkable when the length of the multilayer electronic component 100 is 1.1 mm or less and the width is 0.55 mm or less, taking manufacturing errors, external electrode size, and the like into account. Here, the length of the multilayer electronic component 100 may refer to a size of the multilayer electronic component 100 in the second direction, and the width of the multilayer electronic component 100 may refer to a size of the multilayer electronic component 100 in the third direction.

As set forth above, one of the various effects of the present disclosure is suppressing plating break by disposing the Sn plating layer on the electrode layer.

One of the various effects of the present disclosure is uniformly forming the Ni plating layer and a thin, uniform plating layer including Pd on the Ni plating layer by flattening a surface on which the Ni plating layer is to be formed and imparting conductivity by disposing the Sn plating layer on the electrode.

One of the various effects of the present disclosure is preventing corrosion or precipitation of the external electrodes and improving reliability.

One of the various effects of the present disclosure is providing the multilayer electronic component suitable for mounting on a substrate using a conductive resin adhesive.

While example exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including dielectric layers and internal electrodes alternately disposed with the dielectric layers; and
an external electrode disposed on the body,
wherein the external electrode includes:
an electrode layer connected to the internal electrode;
an Sn plating layer disposed on the electrode layer;
an Ni plating layer disposed on the Sn plating layer; and
a plating layer including Pd disposed on the Ni plating layer, and
wherein a thickness of the Sn plating layer from the electrode layer to the Ni plating layer is 0.02 to 0.1 μm.

2. The multilayer electronic component of claim 1, wherein a thickness of the Ni plating layer is 1 to 8 μm.

3. The multilayer electronic component of claim 2, wherein a thickness of the plating layer including Pd is 0.1 to 1.0 μm.

4. The multilayer electronic component of claim 3, wherein
the body includes first and second surfaces opposing each other in a first direction, third and fourth surfaces connected to the first and second surfaces and opposing each other in a second direction, and fifth and sixth surfaces connected to the first to fourth surfaces and opposing each other in a third direction,
the external electrode is disposed on one of the third and fourth surfaces, and
the thickness of the Ni plating layer is a size of the Ni plating layer in the second direction, the thickness of the Sn plating layer is a size of the Sn plating layer in the second direction, and the thickness of the plating layer including Pd is a size of the plating layer including Pd in the second direction, measured from a cross section of the multilayer electronic component at a center of the third and fourth surfaces in the first and third directions.

5. The multilayer electronic component of claim 4, wherein the external electrode includes a first external electrode disposed on the third surface and a second external electrode disposed on the fourth surface, and
the internal electrodes include a first internal electrode exposed to the third surface and connected to the first external electrode and a second internal electrode exposed to the fourth surface and connected to the second external electrode.

6. The multilayer electronic component of claim 3, wherein the body includes first and second surfaces opposing each other in a first direction, third and fourth surfaces connected to the first and second surfaces and opposing each other in a second direction, and fifth and sixth surfaces connected to the first to fourth surfaces and opposing each other in a third direction,
the external electrode is disposed on one of the third and fourth surfaces, and
the thickness of the Ni plating layer, the thickness of the Sn plating layer, and the thickness of the plating layer including Pd are measured from a cross-section of the multilayer electronic component taken in the first and second directions at a center of the body in the third direction.

7. The multilayer electronic component of claim 6, wherein the external electrode includes a first external electrode disposed on the third surface and a second external electrode disposed on the fourth surface, and
the internal electrodes include a first internal electrode exposed to the third surface and connected to the first external electrode and a second internal electrode exposed to the fourth surface and connected to the second external electrode.

8. The multilayer electronic component of claim 3, wherein the electrode layer includes a first electrode layer connected to the internal electrode and including a conductive metal and glass, and a second electrode layer disposed on the first electrode layer and including a conductive metal and a base resin.

9. The multilayer electronic component of claim 1, wherein the electrode layer includes a conductive metal and glass.

10. The multilayer electronic component of claim 9, wherein the conductive metal is Cu.

11. The multilayer electronic component of claim 1, wherein a thickness of the Ni plating layer is 1 to 8 μm.

12. The multilayer electronic component of claim 1, wherein a thickness of the plating layer including Pd is 0.1 to 1.0 μm.

13. The multilayer electronic component of claim 1, wherein a thickness of the Sn plating layer is less than a thickness of the Ni plating layer.

14. The multilayer electronic component of claim 1, wherein the electrode layer, the Sn plating layer, the Ni plating layer disposed on the Sn plating layer, and the plating layer including Pd are sequentially disposed on the body.

* * * * *